United States Patent
Cusin et al.

(10) Patent No.: US 10,001,750 B2
(45) Date of Patent: *Jun. 19, 2018

(54) RESONATOR WITH REDUCED SENSITIVITY TO CLIMATIC VARIATIONS

(71) Applicant: Nivarox-FAR S.A., Le Locle (CH)

(72) Inventors: Pierre Cusin, Villars-Burquin (CH); Thierry Hessler, St-Aubin (CH); Fatmir Salihu, Neuchatel (CH); Lucie Brocher, Sion (CH)

(73) Assignee: Nivarox-FAR S.A., Le Locle (CH)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/763,721

(22) PCT Filed: Feb. 13, 2014

(86) PCT No.: PCT/EP2014/052833
§ 371 (c)(1),
(2) Date: Jul. 27, 2015

(87) PCT Pub. No.: WO2014/146833
PCT Pub. Date: Sep. 25, 2014

(65) Prior Publication Data
US 2015/0355600 A1 Dec. 10, 2015

(30) Foreign Application Priority Data

Mar. 19, 2013 (EP) ..................... 13159870

(51) Int. Cl.
*G04B 17/06* (2006.01)
*G04B 17/22* (2006.01)
(Continued)

(52) U.S. Cl.
CPC .............. *G04B 17/227* (2013.01); *F16F 1/10* (2013.01); *G04B 17/063* (2013.01); *G04B 17/22* (2013.01); *G04B 17/24* (2013.01)

(58) Field of Classification Search
CPC ...... G04B 17/066; G04B 17/22; G04B 17/24; G04B 17/227
(Continued)

(56) References Cited

U.S. PATENT DOCUMENTS 3,368,919 A * 2/1968 Casale .................. H01C 1/032
257/635
3,615,947 A * 10/1971 Yamada ............ H01L 21/31111
148/DIG. 106
(Continued)

FOREIGN PATENT DOCUMENTS

| CH | 488 244 A | 3/1970 |
| CH | 699 780 A2 | 4/2010 |

(Continued)

OTHER PUBLICATIONS

"Tantalum", Jan. 17, 2010, Retrieved on Sep. 15, 2016 from <http://en.wikipedia.org/wiki/Tantalum>, Wikipedia, whole document.*
(Continued)

*Primary Examiner* — Amy Cohen Johnson
*Assistant Examiner* — Daniel Wicklund
(74) *Attorney, Agent, or Firm* — Oblon, McClelland, Maier & Neustadt, L.L.P.

(57) ABSTRACT

A compensating balance spring for a thermally compensated sprung balance resonator including a core formed from at least one non-metallic material. The core is partially coated with at least one layer which is moisture proof to render the balance spring less sensitive to climatic variations.

20 Claims, 1 Drawing Sheet

(51) Int. Cl.
*G04B 17/24* (2006.01)
*F16F 1/10* (2006.01)

(58) Field of Classification Search
USPC .................................. 368/171, 175, 182
See application file for complete search history.

(56) References Cited

U.S. PATENT DOCUMENTS

| | | | |
|---|---|---|---|
| 8,641,023 B2* | 2/2014 | Charbon | ............... F16F 1/024 267/180 |
| 2008/0037376 A1* | 2/2008 | Lippuner | .............. G04B 15/14 368/139 |
| 2009/0016173 A1* | 1/2009 | Hessler | ................. C03C 15/00 368/140 |
| 2010/0214880 A1 | 8/2010 | Rappo et al. | |
| 2011/0069591 A1* | 3/2011 | Daout | ................. G04B 17/066 368/175 |
| 2011/0292770 A1* | 12/2011 | Damasko | ............ G04B 17/066 368/175 |
| 2011/0305120 A1* | 12/2011 | Hessler | .................. G04F 5/063 368/159 |
| 2012/0230159 A1* | 9/2012 | Hessler | ............... G04B 17/227 368/160 |

FOREIGN PATENT DOCUMENTS

| | | | | |
|---|---|---|---|---|
| CH | 700 024 B1 | | 6/2010 | |
| CH | 701605 A2 * | | 2/2011 | ........... G04B 17/066 |
| CH | 702 353 A2 | | 6/2011 | |
| CH | 711275 A2 * | | 12/2016 | ............. G04B 17/06 |
| DE | 10 2008 029 429 A1 | | 4/2009 | |
| DE | 10 2009 031 841 A1 | | 11/2010 | |
| EP | 1 837 722 A2 | | 9/2007 | |
| FR | 3032810 A1 * | | 8/2016 | ........... B81B 3/0081 |
| WO | 2007/000271 A1 | | 1/2007 | |
| WO | WO 2011072960 A1 * | | 6/2011 | ........... G04B 17/227 |
| WO | WO 2016199039 A1 * | | 12/2016 | ........... G04B 17/227 |

OTHER PUBLICATIONS

"Metal", Jul. 10, 2009, Retrieved on Sep. 15, 2016 from <http://en.wikipedia.org/wiki/Metal>, Wikipedia, pp. 1-2.*
"Passivation of Metals", Sep. 23, 2010, Retrieved on Sep. 15, 2016 from <http://www.misumi-techcentral.com/tt/en/surface/2010/08/052-passivation-of-metals.html>, Technical Tutorial, whole document.*
"Titanium Nitride", Apr. 1, 2011, Retrieved on Sep. 15, 2016 from <http://en.wikipedia.org/wiki/Titanium_nitride>, Wikipedia, whole document.*
"Zinc oxide", Wikipedia, retrieved on Apr. 14, 2017 from https://en.wikipedia.org/wiki/Zinc_oxide.*
"Titanium dioxide", Wikipedia, retrieved on Apr. 14, 2017 from https://en.wikipedia.org/wiki/Titanium_dioxide.*
"Chromium(III) oxide", Wikipedia, retrieved on Apr. 14, 2017 from https://en.wikipedia.org/wiki/Chromium(III)_oxide.*
"Rust", Wikipedia, retrieved on Apr. 14, 2017 from https://en.wikipedia.org/wiki/Rust.*
"Noble Metal", Wikipedia, retrieved on Apr. 14, 2017 from https://en.wikipedia.org/wiki/Noble_metal.*
International Search Report dated Sep. 18, 2014 in PCT/EP14/052833 Filed Feb. 13, 2014.

* cited by examiner

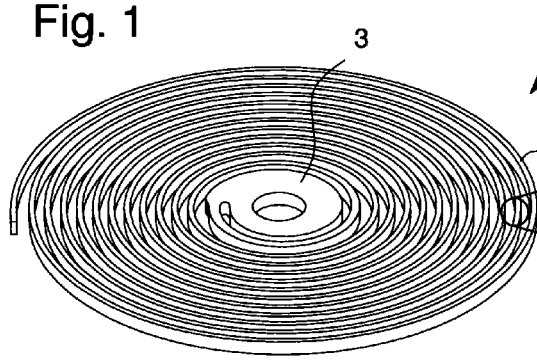
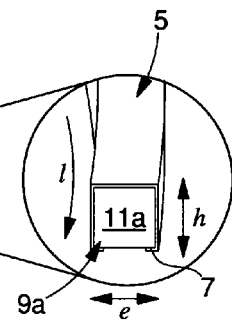
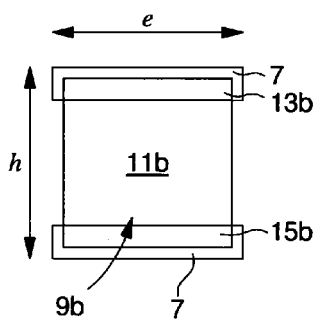
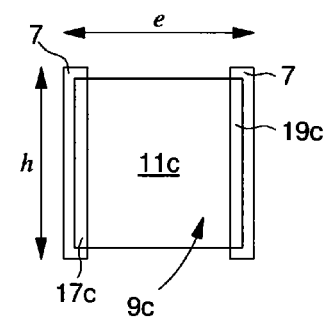
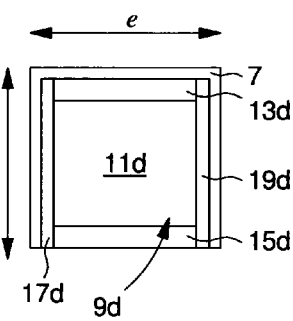
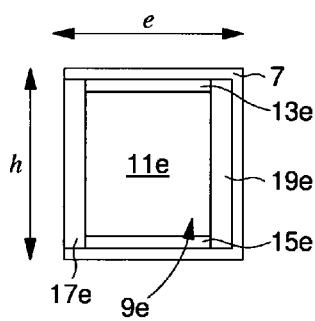
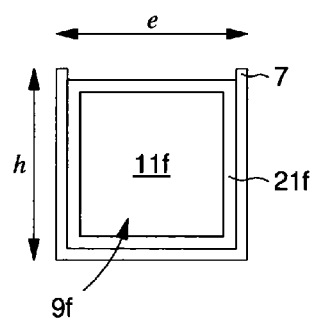

RESONATOR WITH REDUCED SENSITIVITY TO CLIMATIC VARIATIONS

CROSS-REFERENCE TO RELATED APPLICATIONS

This is a National phase application in the United States of International patent application PCT/EP2014/052833 filed Feb. 13, 2014 which claims priority on European patent application 13159870.8 filed Mar. 19, 2013. The entire disclosures of the above patent applications are hereby incorporated herein by reference.

FIELD OF THE INVENTION

The invention relates to a thermally compensated sprung balance resonator wherein the compensating balance spring has reduced sensitivity to climatic variations.

BACKGROUND OF THE INVENTION

During severe condensation tests on timepiece movements, it became apparent that the working of the movements could be affected.

SUMMARY OF THE INVENTION

It is an object of the present invention to overcome all or part of the aforementioned drawbacks, by providing a balance spring with a non-metallic core which has reduced sensitivity to climatic variations.

The invention therefore relates to a compensating balance spring for a thermally compensated sprung balance resonator comprising a core formed from at least one non-metallic material which includes quartz or doped silicon (or undoped silicon) on which there is at least partially formed a coating of silicon dioxide, characterized in that the core is partially coated with a layer which is resistant and impermeable to moisture so as to render the compensating balance spring less sensitive to climatic variations.

It is thus clear that, even in the event of severe condensation, the working of the compensating balance spring will be less disrupted so that the overall working of the resonator, which is formed thereby in cooperation with a balance, is not affected or is barely affected.

In accordance with other advantageous features of the invention:
- the layer which is resistant and impermeable to moisture has a thickness of less than 50 nm;
- the layer which is resistant and impermeable to moisture includes chromium, titanium or tantalum;

Moreover, the invention relates to a thermally compensated resonator for a timepiece including a balance, characterized in that the balance cooperates with a compensating balance spring according to any of the preceding variants.

BRIEF DESCRIPTION OF THE DRAWINGS

Other features and advantages will appear clearly from the following description, given by way of non-limiting illustration, with reference to the annexed drawings, in which:

FIG. 1 shows a compensating balance spring according to the invention.

FIGS. 2 to 7 show variants of the section of the compensating balance spring according to the invention.

DETAILED DESCRIPTION OF PREFERRED EMBODIMENTS

A study was carried out to determine the behaviour of timepiece movements as a function of severe condensation. The study was carried out by forcing the dew point to be sharply exceeded, for example by maintaining a hygrometry rate of more than 80% and by reducing the temperature by at least 15° C.

It was demonstrated that the working of a timepiece could be affected, in particular where the compensating balance spring of a sprung balance resonator is formed at least partially from a crystalline or amorphous silicon oxide. This type of compensating balance spring may be formed, for example, from doped or undoped crystalline silicon on which there is at least partially formed a silicon dioxide coating, or from quartz.

The study also demonstrated that the effect of severe condensation may be minimised by a partial barrier against moisture formed on the compensating balance spring comprising a crystalline or amorphous silicon oxide.

Consequently, the invention relates to a compensating balance spring for a thermally compensated sprung balance resonator including a core formed from at least one non-metallic material. Advantageously according to the invention, the core is partially coated with a layer that is moisture proof, i.e. resistant and impermeable to moisture, in order to render the compensating balance spring less sensitive to climatic variations.

According to the invention, "partially coated" core means not entirely coated, i.e. only one portion of the core is coated such as one or more faces or even only one face portion. However, it is preferred that a maximum of oxidised parts are coated without coating the entire balance spring.

According to the invention, the moisture proof layer has a thickness of less than 50 nm and preferably of around 10 nm to avoid mechanically affecting the working of the balance spring. However, the thickness of the moisture proof layer may be up to several micrometers, but must, in that case, be taken into account as regards the thermal compensation of the sprung balance resonator.

Moreover, it is preferable for the moisture proof layer to be electrically conductive and have low insensitivity to magnetic fields such as, for example, diamagnetic, antiferromagnetic or paramagnetic.

By way of example, the moisture proof layer may thus include chromium, titanium, tantalum, aluminium, zirconium, alumina, chromium oxide, chromium tungsten, PTFE or silicon nitride ($Si_3N_4$). However, chromium, titanium, tantalum or one of their alloys are preferred as they demonstrated the best results.

FIGS. 1 to 7 show variants of a balance spring 1 obtained according to the invention and intended to thermally compensate the resonator thereby formed in cooperation with a balance. Compensating balance spring 1 preferably includes a collet 3 integral with the strip 5 wound into several coils. According to the invention, at least one strip 5 of compensating balance spring 1 is only partially coated with a layer 7, which forms a barrier against moisture.

Strip 5 has a length 1, a thickness e and a height h. It includes a core 9a, 9b, 9c, 9e, 9f formed from at least one material 11, 11b, 13b, 15b, 11c, 17c, 19c, 11d, 13d, 15d, 17d, 19d, 11e, 13e, 15e, 17e, 19e, 11f, 21f.

According to the variants of FIGS. 2 to 7, core 9a, 9b, 9c, 9d, 9e, 9f may be formed from a single material 11a such as, for example, quartz, or from several materials 11b, 13b, 15b, 11c, 17c, 19c, 11d, 13d, 15d, 17d, 19d, 11e, 13e, 15e, 17e, 19e, 11f, 21f.

When core 9b, 9c, 9d, 9e, 9f is formed from several materials, it may be entirely coated 11d, 13d, 15d, 17d, 19d, 11e, 13e, 15e, 17e, 19e, 11f, 21f or partially coated 11b, 13b, 15b, 11c, 17c, 19c with several material before strip 5 of balance spring 1 is partially coated with a layer 7 which is moisture proof, i.e. resistant and impermeable to moisture.

Each coating 13b, 15b, 17c, 19c, 13d, 15d, 17d, 19d, 13e, 15e, 17e, 19e may or may not be of the same type and of the same thickness. By way of example, core 9b, 9c, 9d, 9e, 9f may include doped or undoped silicon 11b, 11c, 11d, 11e, 11f, on which there is at least partially formed a silicon dioxide coating 13b, 15b, 17c, 19c, 13d, 15d, 17d, 19d, 13e, 15e, 17e, 19e, 21f.

As seen in FIGS. 2 to 7, partial coating 7 may be present over all or part of thickness e and/or all or part of height h and/or all or part of length 1 without the balance spring being entirely coated. However, it is preferred that a maximum of oxidised parts is coated as is the case of FIGS. 3 and 4 in which the preferably oxidised coatings 13b, 15b, 17c, 19c are protected by layers 7 which are moisture proof.

The invention also relates to a method for fabricating a compensating balance spring 1 for a thermally compensated sprung balance resonator comprising the following steps:

a) forming a balance spring including a thermally compensated core 9a, 9b, 9c, 9d, 9e, 9f formed from at least one material 11a, 11b, 13b, 15b, 11c, 17c, 19c, 11d, 13d, 15d, 17d, 19d, 11e, 13e, 15e, 17e, 19e, 11f, 21f;

b) partially coating core 9a, 9b, 9c, 9d, 9e, 9f with at least one layer 7 which is moisture proof so as to render balance spring 1 less sensitive to climatic variations.

According to the invention, step a) may be obtained by etching the desired pattern of the balance spring in the desired plate to form all or part 11a, 11b, 11c, 11d, 11e, 11f, of core 9a, 9b, 9c, 9d, 9e, 9f. In the example of crystalline silicon and quartz, it is possible to envisage a deep reactive ion etch (DRIE) to accomplish step a).

Of course, step a) also includes at least one second phase 13b, 15b, 17c, 19c, 13d, 15d, 17d, 19d, 13e, 15e, 17e, 19e, 21f of partially or totally coating the balance spring obtained from the etch in the first phase to finish the core 9b, 9c, 9d, 9e, 9f. This second phase may, for example, consist of thermal oxidation intended to form a silicon dioxide when a doped or undoped crystalline silicon wafer has been etched in the first phase of step a).

Step b) allows the deposition of at least one moisture proof layer 7 having a thickness of less than 50 nm and preferably of around 10 nm. Step b) may be accomplished, for example, by any thin layer deposition method, such as vapour phase deposition so as, preferably, to deposit chromium, titanium or tantalum or one of the alloys thereof, which are also advantageously electrically conductive materials insensitive to magnetic fields.

Of course, this invention is not limited to the illustrated example but is capable of various variants and alterations that will appear to those skilled in the art. In particular, any material capable of forming a barrier against moisture may be envisaged and cannot be limited to chromium, titanium or tantalum or one of the alloys thereof or even to the other materials cited in this description.

It is also possible to choose the moisture proof material as a function of its particular colour so as to improve its aesthetic appearance where the timepiece includes parts which enable the balance spring to be seen, such as, for example, a "skeleton" timepiece or a timepiece with a transparent back cover.

The invention claimed is:

1. A compensating balance spring for a thermally compensated sprung balance resonator comprising:
a core formed from at least one non-metallic material including quartz,
wherein the core is partially coated with at least one layer which is resistant and impermeable to moisture and comprises chromium,
the at least one layer that is resistant and impermeable to moisture is at least partially formed on an oxidized coating that is interposed between the core and the at least one layer, so that the at least one layer that is resistant and impermeable to moisture protects the oxidized coating from being exposed, and
the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

2. A compensating balance spring for a thermally compensated sprung balance resonator comprising:
a core formed from at least one non-metallic material including quartz,
wherein the core is partially coated with at least one layer which is resistant and impermeable to moisture and is made of titanium,
the at least one layer that is resistant and impermeable to moisture is at least partially formed on an oxidized coating that is interposed between the core and the at least one layer, so that the at least one layer that is resistant and impermeable to moisture protects the oxidized coating from being exposed, and
the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

3. A compensating balance spring for a thermally compensated sprung balance resonator comprising:
a core formed from at least one non-metallic material including quartz,
wherein the core is partially coated with at least one layer which is resistant and impermeable to moisture and comprises tantalum,
the at least one layer that is resistant and impermeable to moisture is at least partially formed on an oxidized coating that is interposed between the core and the at least one layer, so that the at least one layer that is resistant and impermeable to moisture protects the oxidized coating from being exposed, and
the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

4. A compensating balance spring for a thermally compensated sprung balance resonator comprising:

a core formed from at least one non-metallic material including silicon on which there is at least partially formed a coating of silicon dioxide, wherein the core is partially coated with a layer which is resistant and impermeable to moisture and comprises chromium, the at least one layer that is resistant and impermeable to moisture is at least partially formed on the coating of silicon dioxide that is interposed between the core and the at least one layer, so that the at least one layer that is resistant and impermeable to moisture protects the coating of silicon dioxide from being exposed, and the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

5. A compensating balance spring for a thermally compensated sprung balance resonator comprising:

a core formed from at least one non-metallic material including silicon on which there is at least partially formed a coating of silicon dioxide, wherein the core is partially coated with a layer which is resistant and impermeable to moisture and is made of titanium, the at least one layer that is resistant and impermeable to moisture is at least partially formed on the coating of silicon dioxide that is interposed between the core and the at least one layer, so that the at least one layer that is resistant and impermeable to moisture protects the coating of silicon dioxide from being exposed, and the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

6. A compensating balance spring for a thermally compensated sprung balance resonator comprising:

a core formed from at least one non-metallic material including silicon on which there is at least partially formed a coating of silicon dioxide, wherein the core is partially coated with a layer which is resistant and impermeable to moisture and comprises tantalum, the at least one layer that is resistant and impermeable to moisture is at least partially formed on the coating of silicon dioxide that is interposed between the core and the at least one layer, so that the at least one layer that is resistant and impermeable to moisture protects the coating of silicon dioxide from being exposed, and the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

7. A compensating balance spring for a thermally compensated sprung balance resonator comprising:

a core formed from at least one non-metallic material including doped silicon on which there is at least partially formed a coating of silicon dioxide, wherein the core is partially coated with a layer which is resistant and impermeable to moisture and comprises chromium, the at least one layer that is resistant and impermeable to moisture is at least partially formed on the coating of silicon dioxide that is interposed between the core and the at least one layer, so that the at least one layer that is resistant and impermeable to moisture protects the coating of silicon dioxide from being exposed, and the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

8. A compensating balance spring for a thermally compensated sprung balance resonator comprising:

a core formed from at least one non-metallic material including doped silicon on which there is at least partially formed a coating of silicon dioxide, wherein the core is partially coated with a layer which is resistant and impermeable to moisture and is made of titanium, the at least one layer that is resistant and impermeable to moisture is at least partially formed on the coating of silicon dioxide that is interposed between the core and the at least one layer, so that the at least one layer that is resistant and impermeable to moisture protects the coating of silicon dioxide from being exposed, and the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

9. A compensating balance spring for a thermally compensated sprung balance resonator comprising:

a core formed from at least one non-metallic material including doped silicon on which there is at least partially formed a coating of silicon dioxide, wherein the core is partially coated with a layer which is resistant and impermeable to moisture and comprises tantalum, the at least one layer that is resistant and impermeable to moisture is at least partially formed on the coating of silicon dioxide that is interposed between the core and the at least one layer, so that the at least one layer that is resistant and impermeable to moisture protects the coating of silicon dioxide from being exposed, and the at least one layer that is resistant and impermeable to moisture includes a thickness that is configured to render the compensating balance spring mechanically less sensitive to variations in temperature and moisture when the at least one layer and a remainder of the core that is not coated with the at least one layer collect condensation of the moisture thereon.

10. The compensating balance spring according to claim 1, wherein the at least one layer that is resistant and impermeable to moisture is electrically conductive.

11. The compensating balance spring according to claim 1, wherein the at least one layer that is resistant and impermeable to moisture coats the oxidized coating without coating the entire balance spring.

12. The compensating balance spring according to claim 1, wherein the at least one layer that is resistant and impermeable to moisture has a thickness of less than 50 nm.

13. The compensating balance spring according to claim 1, wherein the compensating balance spring is less sensitive to the climatic variations despite the remainder of the core that is not coated with the at least one layer being exposed to collect the condensation of the moisture thereon that is formed under a hygrometry rate of more than 80%.

14. The compensating balance spring according to claim 1, wherein the remainder of the core that is not coated with the at least one layer includes at least one side surface of the core that extends along a height of the compensating balance spring.

15. The compensating balance spring according to claim 1, wherein the remainder of the core that is not coated with the at least one layer includes two side surfaces of the core that extend along a height of the compensating balance spring.

16. The compensating balance spring according to claim 1, wherein the remainder of the core that is not coated with the at least one layer includes at least a top surface of the core that extends along a thickness of the compensating balance spring.

17. The compensating balance spring according to claim 1, wherein the remainder of the core that is not coated with the at least one layer includes at least a bottom surface of the core that extends along a thickness of the compensating balance spring.

18. The compensating balance spring according to claim 1, wherein the remainder of the core that is not coated with the at least one layer includes top and bottom surfaces of the core that extend along a thickness of the compensating balance spring.

19. The compensating balance spring according to claim 1, wherein the at least one layer that is resistant and impermeable to moisture is diamagnetic, antiferromagnetic or paramagnetic.

20. A compensating balance spring for a thermally compensated sprung balance resonator comprising:
a core formed from at least one non-metallic material including quartz,
wherein the core is partially coated with at least one layer which is resistant and impermeable to moisture and comprises chromium to render the compensating balance spring less sensitive to variations in temperature and moisture when the at least one layer and a remainder of the core that is not coated with the at least one layer collect condensation of the moisture thereon, and
wherein at least one gap is formed by at least one pair of opposing surfaces of the at least one layer and by at least one surface of the remainder of the core that is not coated with the at least one layer.

* * * * *